June 23, 1953         A. G. COOLEY         2,643,174
FACSIMILE STYLUS CARRIER AND DRIVE SYSTEM
Filed Oct. 13, 1949                     3 Sheets-Sheet 1

INVENTOR.
A.G. COOLEY
BY
attorney

June 23, 1953 A. G. COOLEY 2,643,174
FACSIMILE STYLUS CARRIER AND DRIVE SYSTEM
Filed Oct. 13, 1949 3 Sheets-Sheet 2

INVENTOR.
A.G. COOLEY
BY
attorney

INVENTOR.
A.G. COOLEY

Patented June 23, 1953

2,643,174

UNITED STATES PATENT OFFICE 2,643,174

FACSIMILE STYLUS CARRIER AND DRIVE SYSTEM

Austin G. Cooley, New York, N. Y., assignor to Times Facsimile Corporation, New York, N. Y., a corporation of New York Application October 13, 1949, Serial No. 121,180

7 Claims. (Cl. 346—139)

This invention relates to facsimile recorders of the current-conducting stylus type and more particularly to a continuous web or flat-type recorder utilizing an endless carrier or belt for supporting the recording styli.

In general terms, the object of the invention is to provide an improved stylus carrier and drive mechanism for continuous recorders which will insure accurately registered recording at high scanning speeds.

Another object of the invention is to provide improved means for supporting and driving the styli of a multiple stylus recorder smoothly and at uniform velocity. Heretofore recorders have been proposed in which the stylus carrier or belt is supported by two rotatable pulleys or wheels and toothed positive driving elements provided on the carrier and one or both of said wheels. For example the wheel is provided with a plurality of teeth adapted to engage holes in the belt or teeth formed on the belt. It has been found that with this construction an irregularity occurred in the loading of the driving mechanism or in the progressive movement of the belt which caused distortion or "jag" in the recorded copy. Since this irregularity is not overcome by even the most precise machining and finishing operations, it is apparently caused by the friction and recurrent slippage of the belt on the surface of the wheel.

In accordance with a feature of the present invention, this difficulty is overcome by providing a construction in which only one tooth or positive driving element is in engagement with the stylus carrier or belt at any one time and as each tooth completes its driving function, the succeeding tooth is positioned to take up the driving load smoothly and without an abrupt change in loading or in belt velocity. This is accomplished by correlating the circumference of the wheel or the spacing between the teeth with the overall length of the belt so that a small gap occurs in advance of the point of engagement of each driving tooth as it takes over the drive function. Preferably this construction is embodied in a drive system wherein one supporting wheel has only frictional engagement with the belt or carrier and tends to drive the same above synchronous speed; the other speed-control wheel, having positive driving engagement with the belt or stylus carrier, is held back to synchronous speed and thus positively holds the belt velocity to synchronous speed.

In accordance with another feature of the invention, the synchronous control wheel is provided with freely rotatable supporting elements for the stylus carrier in addition to the positive driving elements whereby the carrier may move freely in the direction of its length to take up the play between the drive teeth without slipping on the periphery of the drive wheel. This contributes to the smoothness of the drive, apparently by eliminating the interaction between the frictional and positive driving elements heretofore encountered.

Another feature of the invention relates to a facsimile recorder of the character described in which an endless stylus carrier or belt is supported and guided in a manner to effect improved recording.

Another feature of the invention relates to the ruggedness, reliability and greater simplicity of the construction.

Other objects and advantages of the invention will appear from the following description of the preferred embodiments thereof shown in the accompanying drawings, wherein.

Figure 1:
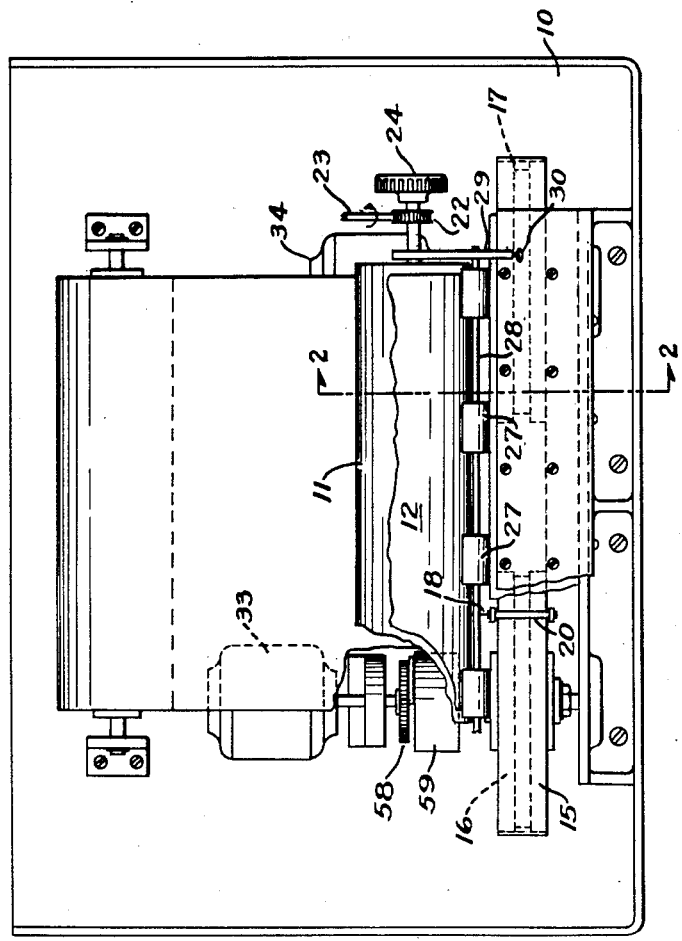
Fig. 1 is a plan view of a facsimile recorder embodying the invention.
Figure 2:
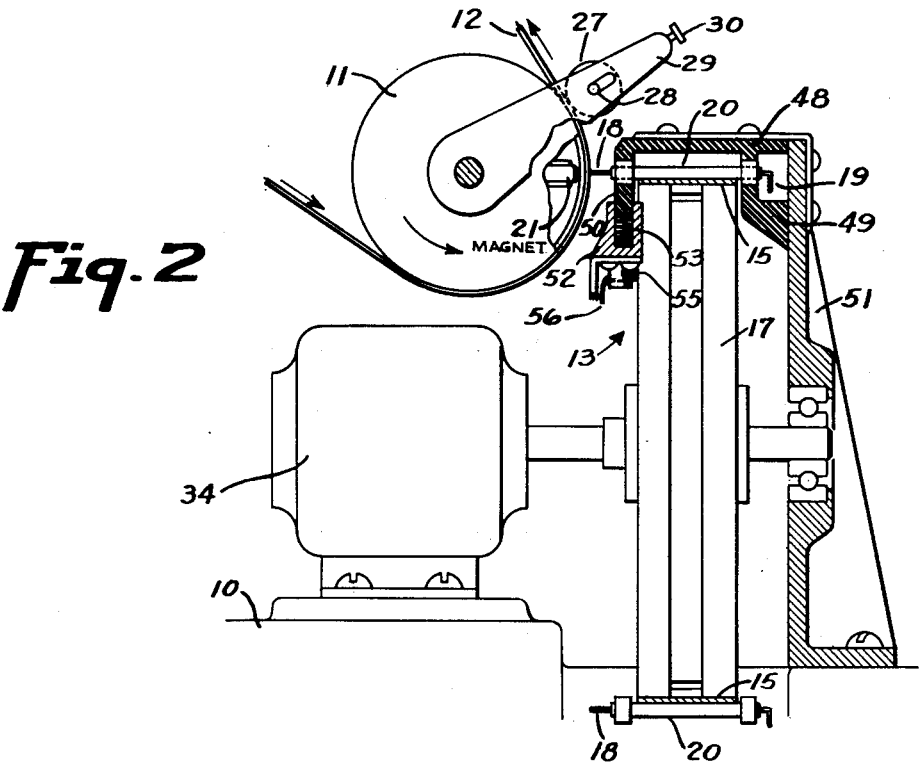
Fig. 2 is a cross-sectional view to an enlarged scale taken on the line 2—2 of Fig. 1.

Referring to Figs. 1 and 2 of the drawings, the recorder shown comprises a base 10 upon which is mounted a paper-feed roll 11 adapted to support and feed a recording sheet or a continuous web 12 in front of the stylus mechanism indicated generally by reference character 13 in Fig. 2. The stylus recording mechanism 13 comprises an endless flexible metal stylus carrier or belt 15 carried on a pair of spaced pulleys or wheels 16 and 17 so that a straight span of the belt is adjacent the recording area on the sheet or web 12. In this manner the styli 18 carried by the stylus carrier or belt 15 traverse the width of the recording medium in succession. The general arrangement of the recorder mechanism shown in the drawings is merely representative of a typical continuous web or flat-type recorder, and other conventional means for supporting and driving the recording sheet and recording mechanism may be employed. The present invention relates to means for supporting and propelling the styli 18 to obtain a uniform movement and exact positioning of each successive stylus as it traverses the recording area to effect distortionless high-speed recording.

The styli 18 are preferably elongated steel needles or rods with an offset portion 19 at the rear end, frictionally held in a close-fitting tubular holder 20. The magnetizable stylus needles are held against the surface of the recording sheet or web 12 at a uniform pressure, as by a stationary magnet 21 inside the hollow feed roll 11, so that the proper recording pressure is maintained throughout the recording area in spite of the friction between the stylus and its holder, wear caused by abrasion at the end of the stylus, and so forth. This feature is disclosed and claimed in my prior applications for patent, Ser. No. 728,865, filed February 15, 1947, and Ser. No. 105,236, filed July 16, 1949. If desired, suitable means may be provided for oscillating the stylus in its holder and lifting it above the edge of the recording sheet at the beginning of the recording area, for example as shown in said prior application Ser. No. 105,236. The disclosures of the mentioned co-pending applications are incorporated herein by reference as a part of the present specification.

The feed roll 11 during operation is driven continuously through a reduction gear 22 and drive shaft 23. A knob 24 attached to the feed roll enables the recording sheet to be fed out manually when desired. The recording sheet or web 12 is held in frictional engagement with the feed roll 11 by means of a series of rubber pressure rollers 27 mounted on a common shaft or spindle 28. The shaft 28 extends into slots in the supporting arms 29 and thumb screws 30 are provided for releasing the shaft and feed rollers when the recorder is loaded with recording paper. Obviously any other suitable arrangement for feeding the recording web during recording may be employed.

The endless stylus carrier or belt 15 is preferably made of strong resilient metal such as beryllium-copper alloy, and carries four equally spaced styli in the embodiment of the invention shown herein. The ends of the belt may be welded or soldered together, or the belt may comprise a one-piece ring drawn to the desired dimensions. The spacing between the styli is such that as each stylus leaves the recording area on the sheet or web 12, the succeeding stylus reaches the beginning of the recording area in phase with the movement of the scanning element of the remote transmitter which may be of a conventional type.

Since facsimile recording involves marking or recording on the recording medium in small successive elemental areas, the perfection of the recording depends to a large extent upon the accuracy with which the picture or copy to be transmitted is faithfully reproduced area by area or dot by dot. The elemental areas are usually about 0.01 inch square or more than one hundred per inch, and thus great precision is required in positioning the several styli of a multiple stylus recorder to avoid imperfection or "jag" in the recorded copy due to inaccurate registration, especially at high speed. It is necessary to index or space each stylus properly and maintain the proper indexing throughout each successive cycle for each stylus which requires that the stylus carrier maintain the uniform or synchronous movement of the styli with great precision. This requirement is exceedingly troublesome and attempts have been made to solve the problem by the use of helical screws and other complicated positioning devices for swivelled or adjustable stylus holders in order to correct for slight displacements of the stylus horizontally and vertically during its movement across the recording area. Such a positioning arrangement is not only complicated, but it is subject to wear. While it is possible to mount the shafts of the supporting pulleys or wheels in accurate bearings and limit end-play and side-play thereof to the necessary degree, and also rotate the pulleys at exactly synchronous speed, it has been found impossible to obtain a perfectly uniform drive of the stylus carrier or belt from a driving synchronous pulley or wheel unless the belt propelling force or drive is independent of the belt-supporting wheels having frictional engagement with the belt.

The present invention embodies a new principle which insures positive uniform drive of the stylus carrier or belt without irregularity or chatter and which obviates the requirement for a helical screw or other stylus positioning device to eliminate "jag" at high speeds of recording. The wheels 16 and 17 are journalled in bearings, for example as shown in Fig. 2, in order to provide accurate steady pivots in the conventional manner. In accordance with the preferred embodiment of the invention, the driving wheel 17 tends to turn above synchronous speed and has only frictional engagement with the stylus carrier or belt 15; and the second wheel 16, which is held back to synchronous speed by a synchronous motor 33, holds the stylus carrier 15 to synchronous speed. The arrangement or construction shown by way of example assumes that the stylus carrier 15 is moving from left to right at the recording area, as shown in Fig. 1, and the right-hand wheel 17 is rotating in a clockwise direction, placing the upper span of the stylus carrier 15 under tension. The wheel or pulley 17 may be driven by an auxiliary over-drive motor 34 which tends to rotate it above synchronous speed as explained above.

Figure 3:
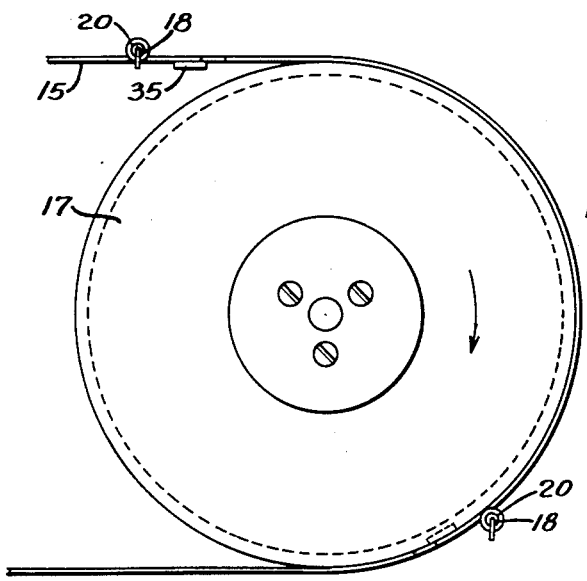
Figs. 3 and 4 are side elevational views of the driving and synchronous wheels for supporting the stylus carrier or belt.

As shown in Figs. 2 and 3, the outside flanges of pulley 17 are in frictional engagement with the stylus carrier 15, the central portion of the pulley being recessed to clear the central lugs 35 on the stylus carrier 15. Thus the drive on the belt 15 is smooth and uniform, avoiding any irregularity or chatter which would be caused by the positive engagement of teeth and the interaction between the positive drive and the friction between the belt and the drive wheel. The width of the recess in the pulley 17 is equal to the width of lug 35 so that the belt or carrier 15 is prevented from creeping on the face of the pulley 17.

Figure 4:
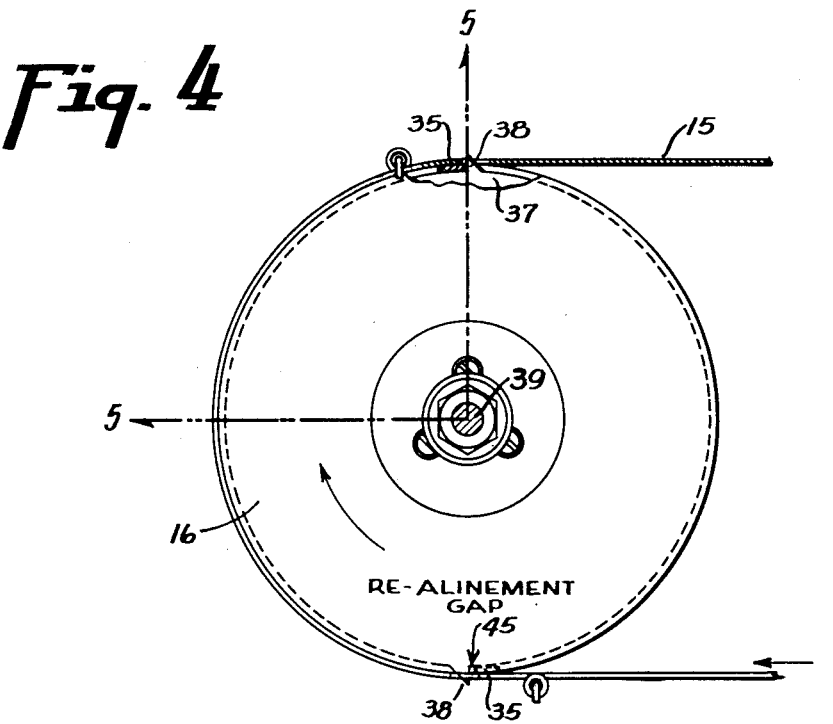
Figure 5:
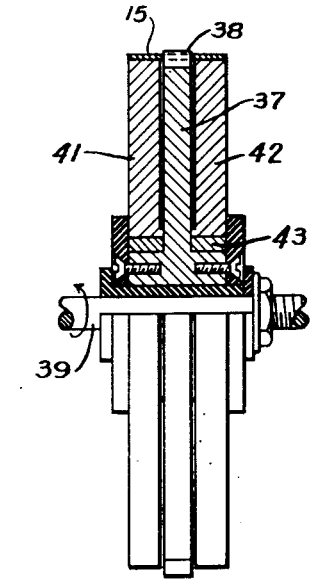
Fig. 5 is a detail view partly in section of the synchronous wheel of Fig. 4.

As shown more clearly in Figs. 4 and 5, there is positive driving engagement between the belt or carrier 15 and the retarding wheel 16 on the shaft of the synchronous motor 33; however the construction is especially designed to avoid any chatter or irregularity in the drag or loading on the belt 15 at the time when the teeth or positive driving elements engage. The wheel 16 comprises a disc member 37 provided with two diametrically opposed teeth 38. The disc member 37 is secured to the synchronously rotating shaft 39 so that the propelling force exerted on the belt 15 reacts against the torque of the synchronous motor 33 through the teeth 38 and lugs 35 on the belt. The wheel 16 further comprises circular supporting discs or idler wheels 41 and 42 which are rotatable on a bearing or journal 43 so as to be rotatable independently of the synchronous shaft 39. The belt or carrier 15 is supported on the freely rotatable discs 41 and 42 so that lengthwise movement of the belt is unimpeded except by the tooth 38 which is controlled by the synchronous motor. Since the discs 41 and 42 rotate with the belt, any slippage and consequent irregular frictional loading of the belt is avoided.

Referring to Fig. 4, it will be noted that only one of the teeth 38 on the retarding disc 37 is in engagement with the belt 15 at any time. When one of the teeth is at the top point in the rotation of the disc 37 and about to leave contact with the belt lug 35, as shown in Fig. 4, the opposite tooth 38 is about to engage the next belt lug 35. In order to prevent any irregularity in drive either because of faulty construction, stretch of the belt or wear of the teeth and lugs, the spacing between the lugs, the diameter of the wheel 16 and the length of the belt 15 are correlated so as to provide a gap 45 between the second lug 35 and the lower tooth 38 as the preceding tooth 38 at the top of the disc 37 disengages from driving contact with the belt 15. This re-alinement gap 45, which is exaggerated in size in Fig. 4 for the sake of clearness, insures that the disengaged tooth 38 at the bottom of the wheel will pick up the belt load smoothly as the upper tooth is disengaged from the belt. Since the belt 15 is over-driven and supported on the freely rotatable discs 41 and 42, the lug 35 at the bottom of the pulley 16 will be moved against the cooperating tooth 38 as soon as the upper tooth is disengaged from its cooperating lug 35 of the belt 15. Thereafter the engagement between the synchronous retarding shaft 39 and the belt or carrier 15 is confined to a single tooth 38 for one-half the revolution of the wheel 16.

Figure 6:
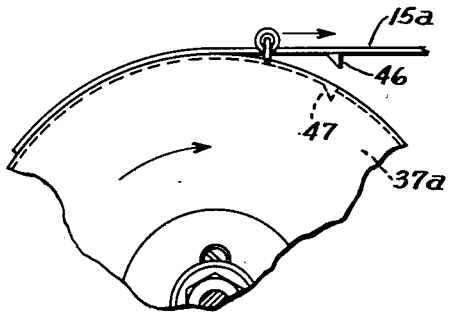
Fig. 6 is a detail view of a modification in which the drive teeth are on the carrier or belt instead of the supporting wheel.

Since each drive tooth does not have to push the belt ahead or pull it back when it comes into engagement with the belt, a constant hold-back pressure is exerted on the belt which insures uniformity of the synchronous belt drive. Furthermore the frictional wear on the teeth and belt lugs is minimized. Among other advantages of this construction is the simplicity of the belt which only carries the small lugs 35 in addition to the stylus holders 20. The belt is practically uniform in mass and stiffness throughout its length which reduces the irregularity in the drive load and enhances the life of the belt. If desired the belt 15 may be provided with the salient teeth and the retarding disc 37 notched. This modification is shown in Fig. 6 wherein a belt 15a corresponding to the belt 15 Fig. 4 is provided with teeth 46 adapted to engage the notches or sockets 47 forming positive drive teeth in the disc 37a corresponding to the synchronous retarding disc 37 of Fig. 5.

As shown more clearly in Fig. 2, the stylus holders 20 are preferably guided during the traverse across the recording area by upper and lower guide bars 48, 49, 50. The bars 48 and 49 may be supported as shown on the upright supports 51 for the belt-wheel bearings. The guide bar 50 is preferably mounted in the U-shaped channel 52 rigidly supported underneath the rear edge of the belt. Compression springs 53 in the channel 52 urge the guide bar 50 against the stylus holders 20. The ends of the stylus holder 20 may be provided with hardened rings or collars as indicated to provide suitable bearing surfaces between the holders and the guide bars. Any other suitable guiding means may be provided in lieu of that shown to prevent vertical displacement of the styli 18 during the recording cycle.

The signal or recording current may be supplied to the styli 18 in any suitable manner, for example through the metallic belt 15. Thus as shown in Fig. 2, a contact brush 55 bearing against the inner face of the wheel 17 and connected to the current lead wire 56 may be provided to conduct the recording current from the amplifier to the styli 18. The current flows through the recording paper to the feed roller 11 which is grounded through the frame of the machine. The wheels 16 and 17 are insulated from the frame by hub insulating collars and bushings as shown in Fig. 5.

The recorder may be phased in the conventional manner to bring the recording stylus belt or carrier into positional phase with the remote transmitter, either in response to phasing pulses from the transmitter or by transmitting a phase pulse or pulses that may be employed to phase the transmitter. As shown in Fig. 1, a phasing mechanism consisting of a ratchet 58 and stop member 59 coupled to the wheel 16 may be interposed between the synchronous motor 33 and the synchronous wheel 16. The ratchet wheel or clutch arrangement 58 permits the stop or phasing member 59 to be stopped until receipt of a phasing pulse without stopping the synchronous motor 33. The detailed construction of the phasing mechanism shown is described in my Patent No. 2,492,621, granted December 27, 1949, but any conventional clutch and latch mechanism having similar characteristics may be employed as stated above.

While the two embodiments of the invention have been shown and described in detail for the purpose of explaining the underlying principles thereof, various modifications in the construction illustrated herein may be made without departing from the scope of the invention. For example, the overdrive of the carrier or belt may be effected through the discs 41 and 42 instead of the wheel 17; and the shape and arrangement of the driving and supporting members may be modified in accordance with the principles set forth above.

I claim:

1. In a facsimile recorder having a recording medium in the form of a sheet or continuous web, means for supporting said sheet or web, an endless stylus carrier or belt, a plurality of spaced styli on said carrier or belt arranged to contact the recording medium, a pair of spaced wheels for supporting said carrier or belt for movement adjacent said recording medium, motor means for driving one of said wheels and tending to propel the carrier or belt above synchronous speed, a synchronous motor connected to the other of said wheels for holding said wheel and said carrier or belt at synchronous speed and positive driving elements on said other wheel and said carrier or belt to prevent slippage between the same when the driving elements are in engagement, the spacing of the driving elements on the belt and of the driving elements on the circumference of said other wheel being correlated to provide a gap between each of the successive driving elements as the preceding driving element on the wheel disengages from driving contact with the belt.

2. In a facsimile recorder having a recording medium in the form of a sheet or continuous web, means for supporting and feeding said sheet or web, an endless stylus carrier or belt, a plurality of spaced styli on said carrier or belt in position to engage the surface of the recording medium or record thereon, overdrive means frictionally engaging said carrier or belt and tending to propel the same above synchronous speed, and a speed-control member having positive driving engagement with said carrier or belt for retarding the same to synchronous speed, said speed-control member comprising a plurality of salient teeth of such spacing with respect to the length of the belt as to provide a gap between each tooth and the belt as the preceding tooth on said speed-control member disengages from driving contact with said belt.

3. In a facsimile recorder having a recording medium in the form of a sheet or continuous web, means for supporting and feeding said sheet or web, an endless stylus carrier or belt, a plurality of equally spaced styli on said carrier or belt in position to engage the surface of the recording medium or record thereon, a pivoted wheel for supporting the belt and frictionally driving the same and a second wheel having independently rotatable supporting and driving members, said driving member consisting of two diametrically opposite teeth having alternate positive driving engagement with the carrier or belt, the space between said teeth being correlated with the length of the belt to provide a gap between each tooth and its cooperating drive element on the belt as the other tooth disengages from driving contact with the carrier or belt.

4. In a facsimile recorder having a recording medium in the form of a sheet or continuous web, means for supporting and feeding said sheet or web, an endless stylus carrier or belt having spaced driving lugs, an idler wheel for supporting said carrier or belt, a speed-control member having two diametrically opposite teeth engaging the lugs on said carrier or belt whereby only one tooth is in engagement at any time with said carrier or belt, the spacing of the lugs on said belt being greater than one-half the pitch circumference of the speed-control member to provide a gap between the tooth and the lug on the belt as the other tooth disengages from driving contact with its corresponding lug on the belt.

5. In a facsimile scanning mechanism employing a movable belt or loop for actuating or propelling a scanning element, means including an idler wheel for supporting said belt or loop and drive means for the belt or loop including a synchronous motor and a toothed rotatable speed-control member concentric with said idler wheel and driven by said motor, said speed-control member having toothed engagement with said belt or loop, each of the teeth on said speed-control member having a radial surface portion or driving face at the point of engagement with said belt or loop.

6. A scanning device for facsimile machines and the like, comprising an endless carrier band carrying at least one scanning element, means to support said band with said scanning element adjacent a surface to be scanned thereby, the last-mentioned means including a pair of wheels mounted in spaced coplanar relation and around which said band passes, the first of said wheels including concentric discs of respectively different diameters with the band passing around and in frictional contact only with the disc of larger diameter, the disc of smaller diameter having spaced synchronizing elements, corresponding interlocking synchronizing elements on said band, said smaller disc being fastened to a rotatable shaft, and said larger disc being freely rotatable around said shaft; the other of said wheels forming a drive pulley in frictional contact with said band, means tending to drive said pulley at a higher rate than a predetermined synchronous speed for said band, and said synchronizing means connected to the said smaller disc of said first wheel to maintain the band at synchronous speed.

7. A precision belt drive arrangement for flat belts, comprising a non-synchronous driving motor, a synchronous synchronizing motor, a belt driving pulley connected to said non-synchronous motor, a synchronizing pulley for said belt connected to said synchronizing motor, said belt having a series of synchronizing elements to register with corresponding synchronizing elements on said synchronizing pulley, said synchronizing pulley comprising three adjacent concentric discs with the middle disc of smaller diameter than the remaining two discs and carrying said corresponding synchronizing elements, said middle disc being connected to said synchronous motor and said other two discs being freely rotatable around the common axis of said three discs, said synchronizing pulley being separate from said driving pulley and being spaced therefrom in coplanar relation.

AUSTIN G. COOLEY.

References Cited in the file of this patent

UNITED STATES PATENTS

| Number | Name | Date |
|---|---|---|
| 2,212,970 | Finch | Aug. 27, 1940 |
| 2,229,973 | Hormal | Jan. 28, 1941 |
| 2,278,919 | Erickson et al. | Apr. 7, 1942 |
| 2,296,274 | Finch | Sept. 22, 1942 |
| 2,464,970 | Finch | Mar. 22, 1949 |
| 2,492,621 | Cooley | Dec. 27, 1949 |

FOREIGN PATENTS

| Number | Country | Date |
|---|---|---|
| 245,410 | Switzerland | July 16, 1947 |